United States Patent
Abendroth et al.

(10) Patent No.: US 12,168,995 B2
(45) Date of Patent: Dec. 17, 2024

(54) PROTECTIVE CAP FOR PARTIALLY COVERING A PRE-ASSEMBLED OR FULLY ASSEMBLED VEHICLE COMPONENT

(71) Applicant: ZF Friedrichshafen AG, Friedrichshafen (DE)

(72) Inventors: Florian Abendroth, Diepholz (DE); Michael Lindemann, Rieste (DE); Eric Holmes, Ramsthal (DE)

(73) Assignee: ZF Friedrichshafen AG, Friedrichshafen (DE)

(*) Notice: Subject to any disclaimer, the term of this patent is extended or adjusted under 35 U.S.C. 154(b) by 62 days.

(21) Appl. No.: 17/568,445

(22) Filed: Jan. 4, 2022

(65) Prior Publication Data
US 2022/0213924 A1    Jul. 7, 2022

(30) Foreign Application Priority Data
Jan. 5, 2021  (DE) ...................... 10 2021 200 045.2

(51) Int. Cl.
*F16C 11/06*    (2006.01)
(52) U.S. Cl.
CPC ................................ *F16C 11/0666* (2013.01)
(58) Field of Classification Search
CPC ........ F16C 11/06; F16C 11/0666; F16C 41/04
See application file for complete search history.

(56) References Cited

U.S. PATENT DOCUMENTS

| | | | | |
|---|---|---|---|---|
| 3,086,801 A * | 4/1963 | Herbenar | ............ | F16C 11/0666 277/635 |
| 3,199,902 A * | 8/1965 | Fierstine | ................. | F16C 11/06 403/12 |
| 3,596,915 A * | 8/1971 | Snidar | ................. | F16C 11/0671 277/635 |
| 3,598,434 A * | 8/1971 | Patton | ................. | F16C 11/0666 403/138 |
| 3,901,518 A * | 8/1975 | Uchida | ............... | F16C 11/0671 277/637 |
| 4,712,940 A * | 12/1987 | Wood, Jr. | ............ | F16C 11/0628 403/133 |
| 4,848,950 A * | 7/1989 | Haberstroh | ......... | F16C 11/0671 403/23 |
| 5,413,431 A * | 5/1995 | Fellows | ................... | F16C 11/06 403/220 |
| 5,498,092 A * | 3/1996 | Fellows | .............. | F16C 11/0666 411/374 |
| 5,531,534 A * | 7/1996 | Urbach | ............... | F16C 11/0671 277/635 |
| 6,334,620 B1 | 1/2002 | Reetz et al. | | |

FOREIGN PATENT DOCUMENTS

DE    10 2016 207 202 A1    11/2017
DE    10 2017 203 687 A1    9/2018
WO         99/34122 A1       7/1999

* cited by examiner

*Primary Examiner* — Daniel J Wiley
(74) *Attorney, Agent, or Firm* — Finch & Maloney PLLC

(57) ABSTRACT

A protective cap (1, 9, 12) for the partial covering of a pre-fitted or a fully fitted vehicle component (11). The protective cap (1, 9, 12) is made from a biogenic and/or renewable raw material.

17 Claims, 3 Drawing Sheets

PROTECTIVE CAP FOR PARTIALLY COVERING A PRE-ASSEMBLED OR FULLY ASSEMBLED VEHICLE COMPONENT

This application claims priority from German Patent Application Serial No. 10 2021 200 045.2 filed Jan. 5, 2021.

FIELD OF THE INVENTION

The invention relates to a protective cap for the partial covering of a pre-fitted or fully fitted vehicle component.

BACKGROUND OF THE INVENTION

A protective cap of this kind is known from DE 2017 293 687 A1. Such protective caps are used for protecting the covered area during painting, transport and/or intermediate storage. A protective cap of this kind can be used one or more times. It is known to produce such a protective cap from plastic, for example by an injection-molding process. In this case, the plastic is based on fossil raw materials, in particular mineral oil or natural gas. Although such plastics can be recycled, that can entail high energy consumption and/or high costs.

SUMMARY OF THE INVENTION

Accordingly, the purpose of the present invention is to provide a protective cap which is improved in terms of ecological and economic aspects. In particular, an alternative embodiment should be provided.

The objective of the invention is achieved by a protective cap according to the invention. Preferred further developments of the invention emerge from the subordinate claims and from the description that follows.

The protective cap is designed for the partial covering of a pre-fitted or fully fitted vehicle component. Preferably the vehicle component is in the form of a chassis component for a motor vehicle. The chassis component can be a linkage or a ball joint. Alternatively the chassis component can be in the form of a control arm, a control arm component, a wheel carrier, a track-rod or an axle carrier, in particular one comprising a linkage or ball joint. In such a case, the linkage or ball joint can be covered by the protective cap.

According to the invention, the protective cap is formed and/or made of a biogenic and/or renewable raw material.

Here, it is advantageous if the protective cap can be produced other than on the basis of fossil raw materials. Thus, from the ecological standpoint, the protective cap made from biogenic and/or renewable materials is more sustainable. In particular, compared with a protective cap made on the basis of fossil raw materials, the energy and costs for producing and/or recycling the protective cap are reduced.

Preferably, the protective cap is made of a recyclable raw material. Preferably, the biogenic and/or renewable raw material from which the protective cap is made is biodegradable and/or compostable. This enables a protective cap no longer in use to be disposed of in a particularly environmentally friendly manner.

According to a further development, the protective cap is made from a cast-fiber material and/or from a cellulose material. In particular, the protective cap is produced by a casting process. For example, the protective cap can be made by means of a suitable cast-fiber process. Preferably the protective cap will be or is made by means of an immersion bath process, for example, from a cellulose material.

The protective cap can be made from any one of the following raw materials or from any desired mixture of two or more of the following raw materials:
 a fiber material, in particular based on hay, straw or hemp, and/or
 pulp or cellulose, in particular based on carton, cardboard or paper, and/or
 a biopolymer, in particular a polyacid polymer or polyhydroxyalkanoate or polyhydroxy-fatty acids, and/or
 palm leaves, and/or
 bagasse.

These are biogenic and/or renewable raw materials which enable particularly environmentally friendly or environmentally sparing production and/or disposal of a protective cap according to the invention. Preferably, the protective cap is formed and/or made exclusively from at least one biogenic and/or renewable raw material.

According to a further embodiment, the raw material is mixed with at least one additive in order to modify at least one property of the material. In that case an additive can be chosen or can be such that by virtue of the at least one additive, the wear resistance, the sliding friction properties, the lubricity, the humidity resistance, the heat resistance and/or the flame resistance of the protective cap is/are improved. Depending on the additive used, the ability of the protective cap to be composted and/or recycled can be changed or impaired.

In a further development, the protective cap can be multi-layered. In particular, the material of the several layers of the protective cap can be different from one another. Preferably, the protective cap has a covering layer on its outside and/or on its inside. The covering layer can be hardened. In other words, in this way, the protective cap can be provided with a hardened surface. The resilience of the protective cap can be thereby improved.

According to another embodiment, the protective cap has a contour by virtue of which a plurality of protective caps can be stacked one above another. Thanks to the stackable shape of the protective cap, a number of protective caps can be stored in a particularly space-saving manner or provided for fitting onto the vehicle component.

It is particularly advantageous to design the protective cap as a protective cap for ball joints, in order to protect a pre-fitted or fully fitted ball joint, in particular on a vehicle component or a chassis component. In automotive engineering ball joints are used in many ways. Particularly in the chassis, ball joints serve to articulate, to one another or to the vehicle body or an axle carrier attached thereto, chassis components such as control arms, control arm components, wheel carriers, track-rods, axle carriers or the like. Preferably, the ball joint is in the form of a ball-and-socket joint. In particular, the protective cap for the ball joint is designed to cover a ball-stud component and a sealing bellows of a fully fitted ball joint. The protective cap for the ball joint can have a first section for covering a sealing bellows of the ball joint and a further section connected to the first section for covering a ball-stud component of the ball joint. In particular, the said further section for covering the ball-stud component can be of a slip-on design.

Preferably, the protective cap has a wall thickness in the range of 1 mm to 3 mm. In particular, the protective cap has a wall thickness of 2 mm. The protective cap can be hollow and/or cup-shaped.

According to a further development, the protective cap has at least one section, in particular two sections, with a funnel-shaped or conical outer surface or outer envelope surface. Preferably, the outer surface or outer envelope surface is inclined at an angle in the range of 6° to 10° relative to a central longitudinal axis of the protective cap. In particular, the outer surface or outer envelope surface is inclined at an angle of 8° relative to a central longitudinal axis of the protective cap. The funnel-shaped or conical outer surface or outer envelope surface improves the stacking configuration of a plurality of protective caps.

BRIEF DESCRIPTION OF THE DRAWINGS

Below, the invention is explained in greater detail with reference to the figures, in which the same indexes denote the same or functionally equivalent components or elements. The figures show.

DETAILED DESCRIPTION OF THE PREFERRED EMBODIMENTS

Figure 1:
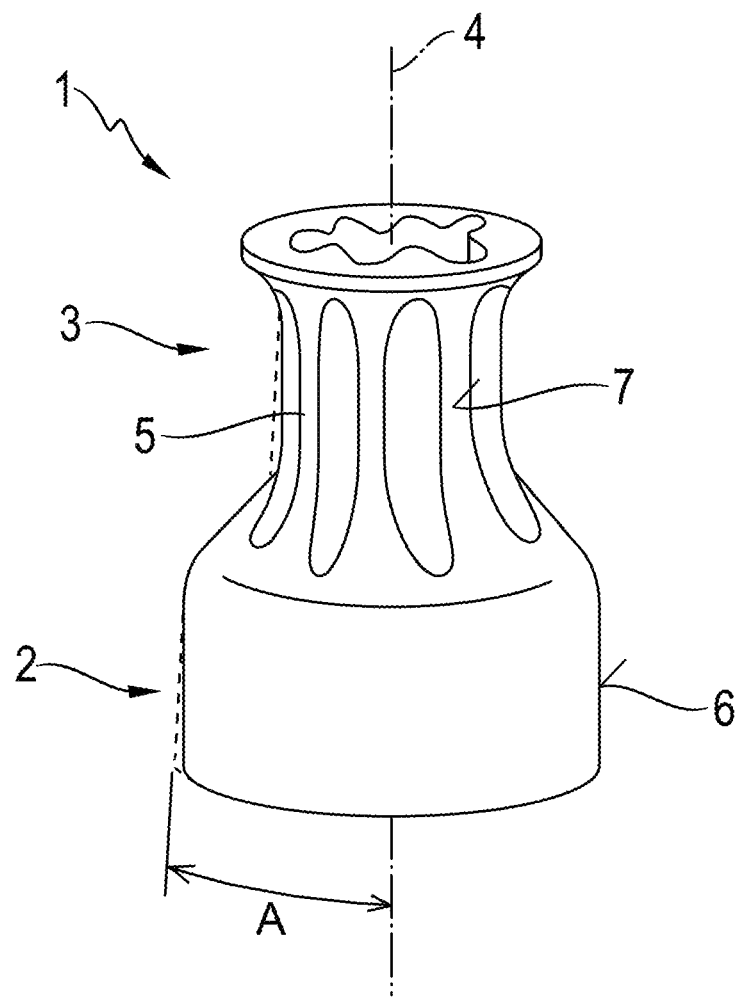
FIG. 1: A side-view of a protective cap according to the invention.

FIG. 1 shows a side-view of a protective cap 1 according to the invention. In this example embodiment, the protective cap 1 is designed as a ball joint protective cap for the protection of a pre-fitted or fully fitted ball joint (not shown in more detail here). In this example embodiment, the protective cap 1 is made from a renewable raw material. For example, the protective cap 1 is made from a cellulose material based on recycled paper, formed from cardboard, pulp or paper. In this way, the protective cap 1 can be recycled after its use, in a particularly environmentally friendly manner.

The protective cap 1 is of hollow design and has a first section 2 and a second section 3. In this case, the first section 2 is designed to cover a sealing bellows of a ball joint (not shown here). The second section 3 is designed to cover part of a ball stud of the ball joint (not shown here). The first section 2 and the second section 3 merge into one another. In this case, the first section 2 and the second section 3 are arranged one after the other in the axial direction of a central longitudinal axis 4.

The first section 2 has a larger outer diameter than the second section 3. Furthermore, in this example embodiment, the second section 3 is ribbed around its outer circumference, with a plurality of ribs 5 extending parallel to the central longitudinal axis 4. For greater clarity, not all the ribs 5 are indexed. The ribs 5 can improve the rigidity and/or load-bearing capacity of the protective cap 1.

Particularly in the area of the first section 2 and the second section 3, the protective cap 1 has a wall thickness of 2 mm. The first section 2 has an outer surface 6 which, in this example embodiment, as shown in dashed line is inclined at an angle A in the range of 6° to 10°, preferably is inclined at an angle of 8° relative to the central longitudinal axis 4. In this example embodiment, the second section 3 has an outer envelope surface or outer surface 7 which, in this example embodiment, as shown in dashed line is inclined at an angle A in the range of 6° to 10°, preferably is inclined at an angle A of 8° relative to the central longitudinal axis 4. Accordingly, a contour or outer contour of overall funnel or conical shape is obtained, such that several protective caps 1 can be stacked one above another.

Figure 2:
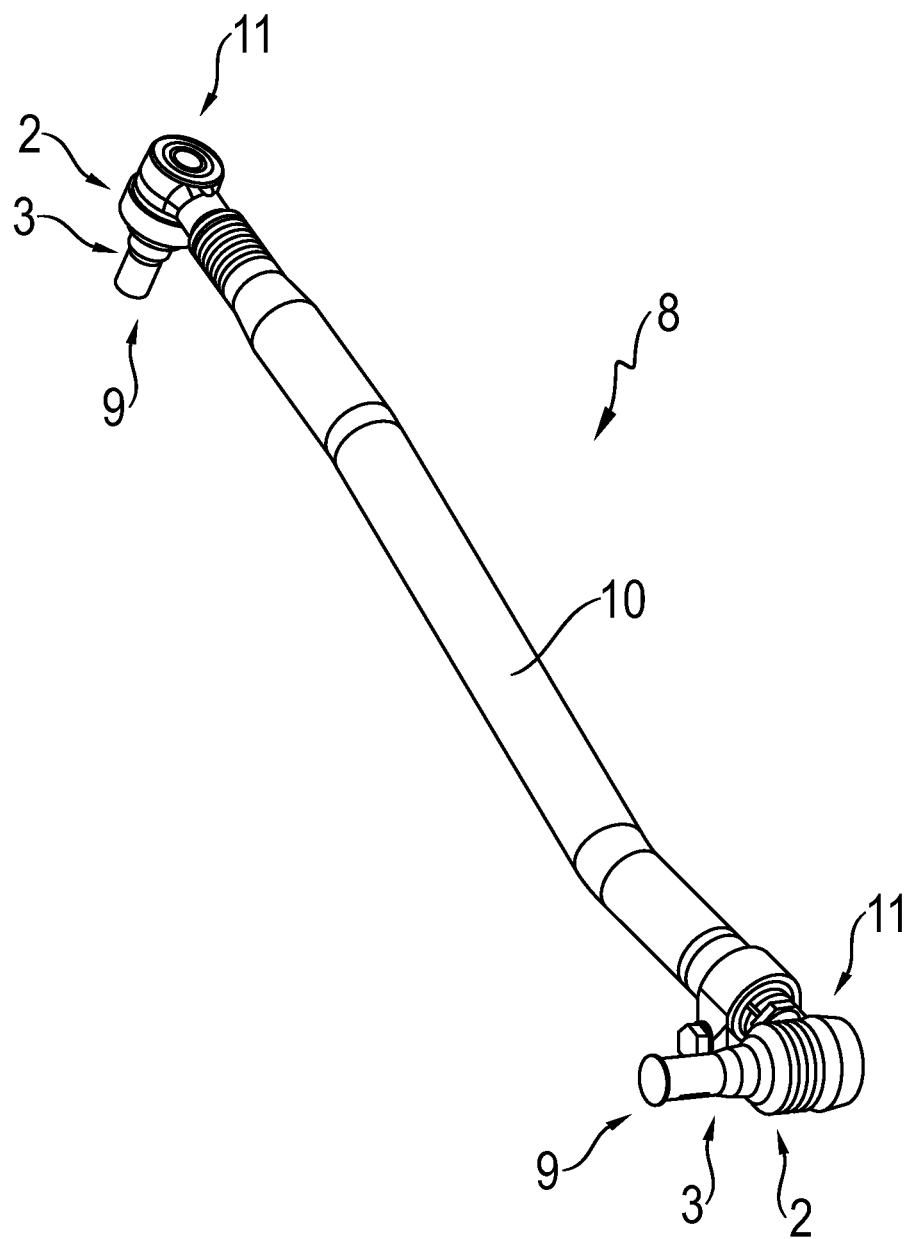
FIG. 2: A perspective side-view of a chassis component with a protective cap according to the invention.

FIG. 2 shows a perspective side view of a chassis component 8 with a protective cap 9, according to the invention. In this example embodiment, the chassis component 8 is in the form of a control arm. In this example embodiment, the chassis component 8 comprises a tubular connecting element 10. At the two free ends of the connecting element 10 are fitted, in each case, a vehicle component designed as a ball joint 11. The ball joint 11 is in the form of a ball-and-socket joint.

The two ball joints 11 are, in each case, partially covered by a protective cap 9. Here, a sealing bellows of the respective ball joint 11 is covered by the first section 2 of the respective protective cap 9. A ball-stud part of the respective ball joint 11 is covered by the second section 3 of the respective protective cap 9.

Alternatively to the embodiment shown here, the protective cap 9 can be designed in accordance with the protective cap 1 in FIG. 1. The essential requirement is that the protective cap 9 is made from a biogenic and/or renewable material.

Figure 3:
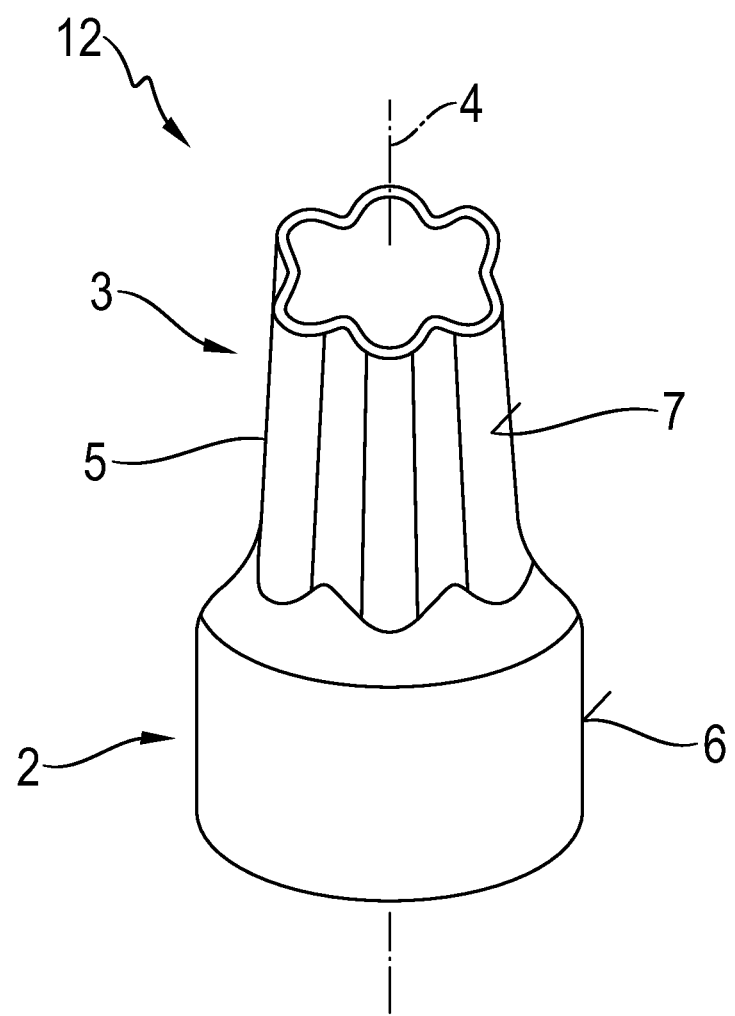
FIG. 3: A side-view of a further protective cap according to the invention.

FIG. 3 shows a side view of a further protective cap 12 according to the invention. The structure of the protective cap 12 corresponds essentially to that of the protective cap 1 in FIG. 1. Accordingly, the same features are denoted by the same indexes and to avoid repetitions reference should be made to the previous description.

It can be seen clearly that, in this example embodiment, the second section 3 of the protective cap 12 has a wall which follows a meandering course. When seen from above in the axial direction of the central longitudinal axis 4, this results in a star-like contour of the wall of the second section 3.

INDEXES

1 Protective cap
2 First section
3 Second section
4 Central longitudinal axis
5 Rib
6 Outer surface
7 Outer surface
8 Chassis component
9 Protective cap
10 Connecting element
11 Vehicle component/ball joint
12 Protective cap

The invention claimed is:

1. A protective cap for partial covering of a pre-fitted or a fully fitted vehicle component for a motor vehicle, the protective cap comprising:
   a hollow design having a first section, designed to radially cover a sealing bellows of a ball joint therein, and a second section, designed to radially cover part of a ball stud of the ball joint therein, and the first and the second sections merge into one another and define a central longitudinal axis;
   the first section having an outer surface which is inclined at an angle in a range of 6° to 10° relative to the central longitudinal axis and the second section has an outer surface which is inclined at an angle in a range of 6° to 10° relative to the central longitudinal axis such that an outer contour of the protective cap has a diameter that continuously decreases along an axial extent of the first section and the second section so to assist with stacking of several protective caps one on top of the other; and
wherein the protective cap is made from a biogenic and/or renewable raw material.

2. The protective cap according to claim 1, wherein the protective cap is made from at least one of a biologically degradable, a compostable and a recyclable raw material.

3. The protective cap according to claim 1, wherein the protective cap is made from one of a cast-fiber material and a cellulose material.

4. The protective cap according to claim 3, wherein the protective cap is made by a casting process.

5. The protective cap according to claim 1, wherein the protective cap is made from any one of the following raw materials or from any desired mixture of two or more of the following raw materials:
   a fiber material,
   pulp or cellulose,
   a biopolymer,
   palm leaves, and
   bagasse.

6. The protective cap according to claim 1, wherein the protective cap is made from any one of the following raw materials or from any desired mixture of two or more of the following raw materials:
   a fiber material based on hay, straw or hemp,
   pulp or cellulose based on carton, cardboard or paper,
   a polyacid polymer or polyhydroxyalkanoate or polyhydroxy-fatty acids,
   palm leaves, and
   bagasse.

7. The protective cap according to claim 1, wherein at least one additive is mixed with the raw material in order to modify at least one material property, and, by virtue of the at least one additive, a wear resistance, a sliding friction properties, a lubricity, a humidity resistance, a heat resistance and/or a flame resistance of the raw material is/are improved.

8. The protective cap according to claim 1, wherein at least one of an outer surface and an inner surface of the protective cap has a covering layer.

9. The protective cap according to claim 8, wherein the covering layer is hardened.

10. The protective cap according to claim 1, wherein the protective cap is designed as a ball joint protective cap for protection of a pre-fitted or fully fitted ball joint.

11. The protective cap according to claim 1, wherein the protective cap has a wall thickness in the range of 1 mm to 3 mm and when viewed from the central longitudinal axis, the wall has a star-like cross sectional contour.

12. The protective cap according to claim 1, wherein the protective cap has a wall thickness of 2 mm.

13. The protective cap according to claim 1, wherein the outer surface of the first section and the outer surface of the second section are inclined relative to the central longitudinal axis of the protective cap by an angle of 8°.

14. A protective cap for partial covering of a pre-fitted or a fully fitted vehicle component,
   wherein the protective cap is made from a biogenic and/or renewable raw material;
   the protective cap comprising a hollow design having a first section, designed to radially cover a sealing bellows of a ball joint therein, and a second section, designed to radially cover part of a ball stud of the ball joint therein, and the first and the second sections merging into one another and defining a central longitudinal axis;
   the first section having an outer surface which is inclined at an angle in a range of 6° to 10° relative to the central longitudinal axis and the second section has an outer surface which is inclined at an angle in a range of 6° to 10° relative to the central longitudinal axis such that an outer contour of the protective cap has a diameter that continuously decreases along an axial extent of the first section and the second section to assist with stacking of several protective caps one on top of the another; and
   at least one additive is mixed with the raw material in order to modify at least one material property, and, by virtue of the at least one additive, a wear resistance, a sliding friction properties, a lubricity, a humidity resistance, a heat resistance and/or a flame resistance of the raw material is/are improved.

15. The protective cap according to claim 14, wherein the protective cap is made from any one of the following raw materials or from any desired mixture of two or more of the following raw materials:
   a fiber material,
   pulp or cellulose,
   a biopolymer,
   palm leaves, and
   bagasse.

16. A protective cap for partial covering of a pre-fitted or a fully fitted control arm which comprises a tubular connecting element having opposed ends respectively fitted with a ball joint, the protective cap comprising:
   a hollow design having a first section, designed to radially cover a sealing bellows of the ball joint therein, and a second section, designed to radially cover part of a ball stud of the ball joint therein, and the first and the second sections merge into one another and defining a central longitudinal axis, the second section has a wall that is formed such that the wall has star-like cross sectional contour when viewed from the central longitudinal axis;
   an outer surface of the second section having a plurality of ribs located around a circumference thereof which extending parallel to the central longitudinal axis of the protective cap, and the plurality of ribs improve at least one of a rigidity and a load-bearing capacity of the protective cap;
   the first section having an outer surface which is inclined at an angle of about 8° relative to the central longitudinal axis and the second section has an outer surface which is also inclined at an angle of about 8° relative to the central longitudinal axis such that an outer contour of the protective cap has a diameter that continuously decreases along an entire axial extent of the protective cap so that several protective caps can be stacked one above another;
   the protective cap being made from a biogenic and/or renewable raw material;
   at least one additive is mixed with the raw material in order to modify at least one material property, and, by virtue of the at least one additive, a wear resistance, a sliding friction properties, a lubricity, a humidity resistance, a heat resistance and/or a flame resistance of the raw material is/are improved; and
   the protective cap has a wall thickness in the range of 1 mm to 3 mm.

17. The protective cap according to claim 16, wherein the protective cap is made from any one of the following raw materials or from any desired mixture of two or more of the following raw materials:
   a fiber material, pulp or cellulose,
a biopolymer,
palm leaves, and
bagasse.

* * * * *